United States Patent
Stanek et al.

(10) Patent No.: US 11,157,233 B1
(45) Date of Patent: Oct. 26, 2021

(54) APPLICATION SUBSET SELECTIVE AUDIO CAPTURE

(71) Applicant: Twitch Interactive, Inc., San Francisco, CA (US)

(72) Inventors: Sean Stanek, West Des Moines, IA (US); Tyler McDowall, Irvine, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 88 days.

(21) Appl. No.: 16/579,002

(22) Filed: Sep. 23, 2019

Related U.S. Application Data

(63) Continuation of application No. 15/634,132, filed on Jun. 27, 2017, now Pat. No. 10,437,551.

(51) Int. Cl.
| | | |
|---|---|---|
| *G06F 17/00* | (2019.01) | |
| *G06F 3/16* | (2006.01) | |
| *G06F 12/0802* | (2016.01) | |
| *G06F 3/0484* | (2013.01) | |

(52) U.S. Cl.
CPC .......... *G06F 3/165* (2013.01); *G06F 3/04847* (2013.01); *G06F 12/0802* (2013.01); *G06F 2212/455* (2013.01)

(58) Field of Classification Search
CPC .. G06F 3/165; G06F 3/04847; G06F 12/0802; G06F 2212/455
See application file for complete search history.

(56) References Cited

U.S. PATENT DOCUMENTS

| | | | |
|---|---|---|---|
| 8,463,612 B1 | 6/2013 | Neath et al. | |
| 10,112,115 B2* | 10/2018 | Abbott | G02B 27/01 |
| 10,200,768 B2* | 2/2019 | Niemeyer | H04N 21/8545 |
| 10,812,549 B1* | 10/2020 | Iskandar | H04L 63/00 |
| 2014/0073298 A1 | 3/2014 | Rossmann | |
| 2017/0109122 A1* | 4/2017 | Schmidt | A63F 13/65 |

OTHER PUBLICATIONS

"Sound Leech"; http://milosoftware.com/en/index.php?body=soundleech.php; MiLo Software; accessed Jun. 20, 2017; 1 page.

* cited by examiner

*Primary Examiner* — Joseph Saunders, Jr.
(74) *Attorney, Agent, or Firm* — BakerHostetler

(57) ABSTRACT

Techniques for selective audio capturing are described herein. In some cases, a user, such as a content provider, may select one or more computing processes from which to capture audio data. The audio data may be captured for transmission to at least one other computing device. Code may be injected into at least the one or more computing processes. In some cases, upon execution of the code, storage locations of the audio data are obtained. Thus, the audio data may be captured from the storage locations, and the captured audio data may be transmitted to one or more other computing devices. Additionally, based, at least in part, on a user selection, other audio data from other computing processes executing on the computing device may not be transmitted to the one or more other computing devices.

20 Claims, 8 Drawing Sheets

APPLICATION SUBSET SELECTIVE AUDIO CAPTURE

CROSS-REFERENCE TO RELATED APPLICATIONS

This application is a continuation of U.S. application Ser. No. 15/634,132 filed Jun. 27, 2017, entitled "APPLICATION SUBSET SELECTIVE AUDIO CAPTURE", the entirety of which is incorporated herein by reference.

BACKGROUND

The use of streaming services to view a provider's video content has increased dramatically in recent years. Providers may transmit video from a computer, for example, in a transmission stream, such that it can be broadcast by a streaming service to connected viewers. Often providers include audio with their transmitted video in a transmission stream. The included audio may be captured by recording the audio that gets read by an input device (e.g., a microphone or line in) or that gets written to an output device (e.g., headphones or speakers). A drawback to capturing audio from an input device, or to an output device, is that the audio tracks for a given application might not be captured separately. For a given application, a provider might not want to include all of the application's audio output in a given stream. In some cases, a provider may want to provide audio from a subset of applications or exclude audio from other applications. One approach to excluding audio from a given application in a broadcast is to create a virtual audio output device, and then set the output device as the virtual audio output device for each application from which audio is desired. One drawback, however, to this approach is that some applications do not allow their audio output device to be changed from a default device. Another drawback is that this approach may result in a complex web of virtual input and output devices mixed together, which may be particularly disadvantageous to providers with limited experience or resources.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
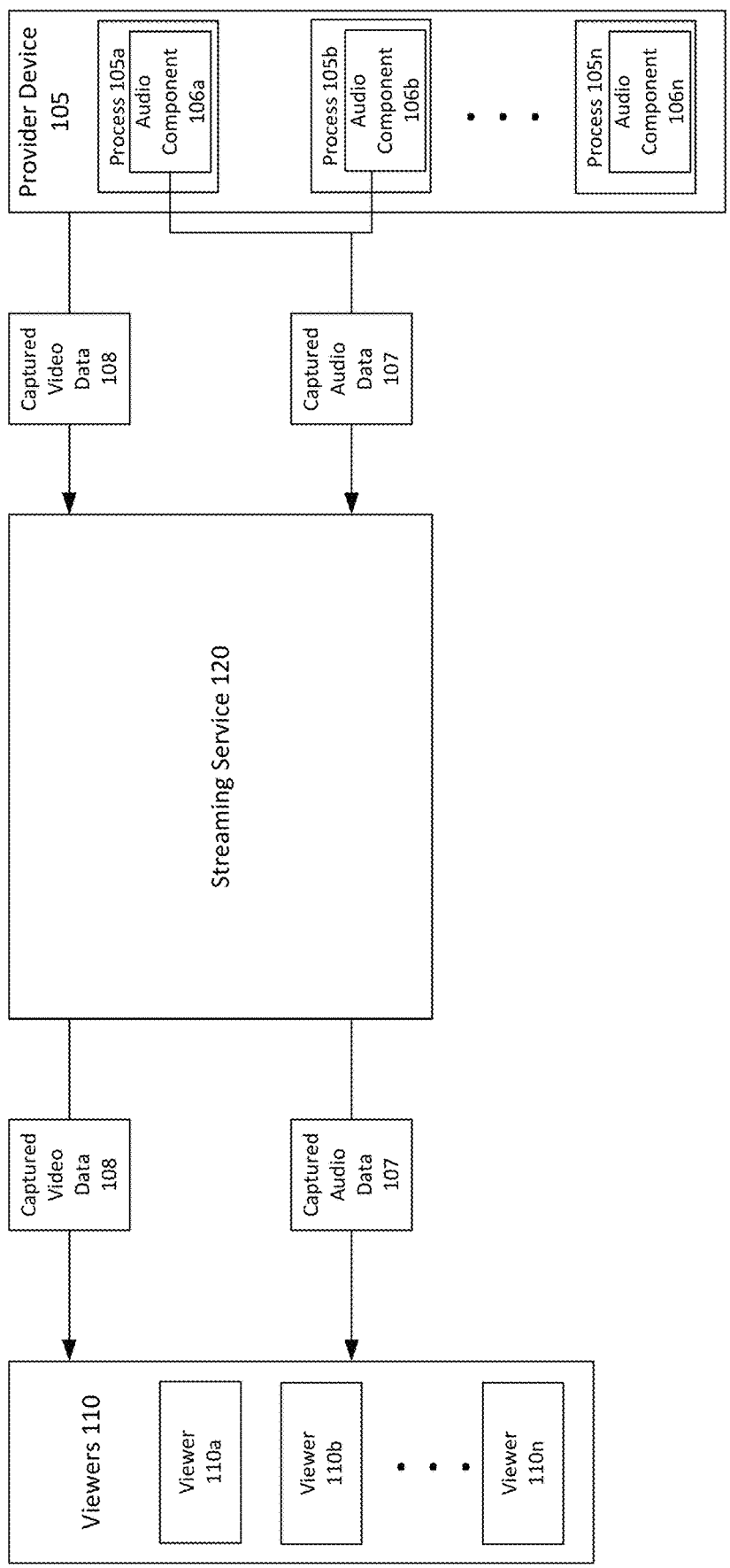
FIG. 1 is a diagram illustrating an example system for audio capturing that may be used in accordance with the present disclosure.

Techniques for application subset selective audio capturing are described herein. In some examples, a streaming service may transmit video and audio content to viewers over a communications network such as the Internet, for example using streaming video and audio transmission techniques. In some cases, the audio content may be provided to the streaming service by a provider by capturing audio from one or more applications, or computing processes. The video content may include, for example, video content that is captured by a provider, transmitted by the provider to the video transmission service, and then, in turn, transmitted by the streaming service to one or more viewers. Similarly, the audio content may include, for example, audio content that is captured by a provider, transmitted by the provider to the video transmission service, and then, in turn, transmitted by the streaming service to one or more viewers. In one specific example, the streaming service may be a service that streams live video game content, and the providers may be video game players that capture the live video game content using screen capture software. In this specific example, the video game players may capture audio content that is part of and/or separate from the live video game content using techniques described herein.

In some examples, the provider may select which audio components will be provided to the streaming service, and which audio components are not provided to the streaming service. This may be advantageous, for example, so that each provider can select audio that is best suited for a particular transmission. In some cases, audio that is playing on a provider device may be selectively prevented from being provided to the streaming service. In a specific example, a video game player may capture audio from a music application while excluding audio from an email application that is running on the provider device. In doing so, the video game player may prevent audible email notifications from being broadcast, but the audible email notifications may still be output locally such that they may be heard by the provider. A plurality of audio components may be mixed together with one another so to as to produce a single audio stream, which can be used for a broadcasting application, among others.

In some cases, to selectively capture audio, a plurality of computing processes, or applications, are identified as executing on a computing device, which may be a provider device for example. A user, such as a content provider for example, may select one or more computing processes from which to capture audio data. The audio data may be captured for transmission to at least one other computing device. In an example, the audio data may be captured for transmission to a streaming service. Code may be injected into one or more computing processes on the provider device. In some cases, upon execution of the code, storage locations of the audio data are determined. Thus, the audio data may be obtained from the storage locations, and the obtained audio data may be selectively transmitted to one or more computing devices. Additionally, based, at least in part, on a user selection, other audio data from other computing processes might not be transmitted to the one or more computing devices.

In some examples, the storage locations are associated with buffers at which audio data is stored for input to an application programming interface (API), such as an API that is native to an operating system (OS) of the provider device, that combines data from various computing processes. In specific examples, the API that is native to the OS is an audio mixer. A native audio mixer may be an API that combines audio data from a plurality of applications. In some examples, the native audio mixer may not allow audio data from different processes and/or different components of a process to be selectively controlled, for example separately and/or individually from one another. Thus, in some examples, the native audio mixer may be limited to all-or-nothing audio control, in which audio from certain individual processes and/or process components cannot be selectively included or excluded from an audio output. As discussed in further detail below, for a given application or for a given set of applications, a provider might not want to include all of the audio output from an application or a set of applications in a given stream. In some cases, a provider may want to select audio from a subset of applications or exclude audio from other applications, which might not be allowed by a native audio mixer. Additionally, in some examples, the all-or-nothing approach of the native audio mixer may not allow transmitted audio to be controlled differently from audio that is output locally. For example, in some cases, the native audio mixer may not allow audio from certain processes and/or process components to be output locally but not transmitted. Furthermore, in some cases, the native audio mixer may not allow audio from certain processes and/or process components to be transmitted at different volumes than which they are output locally.

In an example, code may be injected into a plurality of computing processes, such that anytime one of the computing processes calls a particular API to receive a buffer memory location to which to write audio data as input to the API, the code is executed so as to obtain the audio data from the buffer memory location. In one example, the audio data is obtained by making a copy of the audio data from the buffer memory location. When the audio data is obtained, a provider may control, for example, audio associated with individual computing processes. In particular, for example, the provider may select audio components that are transmitted and played locally, audio components that are transmitted but not played locally, audio components that are played locally but not transmitted, and still other audio components that are neither played locally nor transmitted. Further, in some cases, the provider can control audio associated with each computing process, such that each computing process may be controlled differently. Further still, in some cases, the provider can control more than one audio component per a given computing process, such that an audio component of a given computing process is transmitted while another audio component of the given computing process is not transmitted. The provider may also control volumes associated with each audio component. In some examples, the provider may control the volume levels that are transmitted independently from the volume levels that are output locally.

FIG. 1 is a diagram illustrating an example system for audio capturing that may be used in accordance with the present disclosure. As shown in FIG. 1, streaming service 120 receives captured video data 108 from provider device 105. Additionally, streaming service 120 receives captured audio data 107 from provider device 105. One or more computing processes may execute on provider device 105. As shown, processes 105a-n are executing on provider device 105. In accordance with the illustrated example, captured audio data 107 comprises audio data from process 105a and process 105n. In particular, audio component 106a and audio component 106b are captured so as to form the audio data in captured audio data 107. In accordance with the illustrated example, audio component 106n from process 105n is not transmitted to streaming service 120 as part of captured audio data 107, and thus audio component 106n is also not transmitted to viewers 110.

Video content and audio content from provider device 105 may be received by streaming service 120 via video intake components and audio intake components, respectively. Streaming service 120 may then transmit the received video and audio content to viewers 110a-n via output streams that include captured video data 108 and captured audio data 107. Captured video data 108 and captured audio data 107 may be transmitted over one or more communications networks, for example including one or more local area networks (LAN's) or one or more wide area networks (WAN's) such as the Internet. In some examples, captured video data 108 and captured audio data 107 may be transmitted using streaming transmission techniques, in which portions of transmitted content may be received and presented to viewers 110 while subsequent portions of the transmitted content are still in the process of being transmitted.

In the example of FIG. 1, processes 105a-n, which each may include respective audio components 106a-n, may execute on provider device 105. In some specific examples, the user of provider device 105 may be a video game player, and captured video data 108 may comprise video from a video game that is played by the user of provider device 105. By way of example, process 105a may be the video game application from which captured video data 108 is captured, and audio component 106a may be audio associated with the video game application. Also, in some examples, streaming service 120 may be a service that streams video game content to various subscribers, such as viewers 110a-n. In an alternative example, captured video data 108 may include other types of video capture components, such as video cameras, for example for capturing video from a news or sporting event.

In some examples, the video and audio content that is provided to viewers 110a-n via streams may include live video content that may be displayed to viewers 110a-n almost immediately (e.g., with only a small time delay) after being transmitted by provider device 105. The live video and audio content may be captured by provider device 105, promptly transmitted by the provider device 105 to the streaming service 120 and then, in turn, promptly transmitted by the streaming service 120 to one or more viewers 110a-n.

As shown in FIG. 1, captured audio data 107 may include audio from a plurality of processes 105a-n executing on the provider device 105. In some examples, the user of the provider device 105 may select which audio components 106a-n of processes 105a-n are transmitted to viewers 110, and thus to streaming service 120. In accordance with the illustrated embodiment, the user of provider device 105 may select that the audio from processes 105a and 105b are transmitted to the viewers 110. Also, in accordance with the illustrated embodiment, the user of the provider device 105 may affirmatively select audio component 106n of process 105n so that audio component 106n is not part of captured audio data 107, and thus is not transmitted to viewers 110. In specific example, process 105a may comprise a video game application, process 105b may comprise a music application, and process 105n may comprise a chat application. Thus, the captured video data 108 may be a video game, and the captured audio data 107 may comprise audio component 106a of the video game, and audio component 106b from the music application. Continuing with the specific example, audio component 106n from the chat application is not part of captured audio data 107, and thus is not transmitted to the viewers 110. Accordingly, conversations from a chat application that executes during game play may be prevented from being transmitted to viewers 110, at the discretion of the user of provider device 105.

Figure 2:
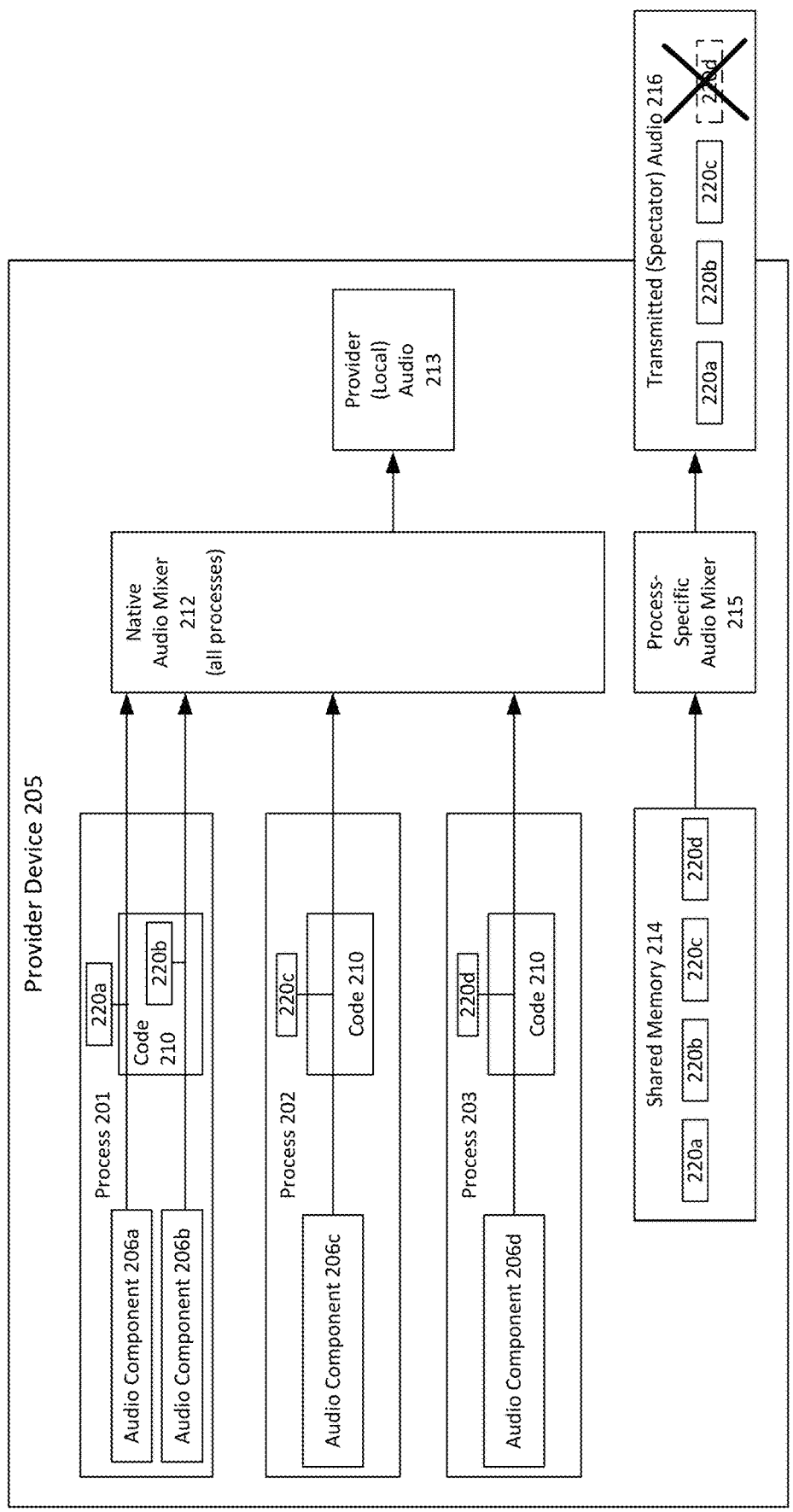
FIG. 2 is a diagram illustrating a first example audio capturing that may be used in accordance with the present disclosure.

Referring now to FIG. 2, an example provider device 205 for audio capturing that may be used in accordance with the present disclosure is illustrated. One or more computing processes may execute on provider device 205. As shown, computing process 201, computing process 202, and computing process 203 may execute on provider device 205. Each of the processes 201, 202, and 203 may include one or more audio components 206. In accordance with the illustrated example, process 201 comprises audio component 206a and audio component 206b. Process 202 comprises audio component 206c, and process 203 comprises audio component 206d.

As described above, code may be injected into one or more computing processes. As shown in FIG. 2, code 210 may be injected into each of the processes 201, 202, and 203. In some cases, in the absence of the code 210, audio components 206a-d may be output from the respective processes to a native audio mixer 212. The native audio mixer 212 may be an application programming interface (API) configured to execute on provider device 205. The native audio mixer 212 may be an API that combines audio data from the plurality of computing processes 201, 202, and 203. For example, a user of the provider device 205 may use the audio mixer 212 to control the volume at which audio components 206a-d are locally played at the provider device 205. Thus, the output of the native audio mixer may be provider (local) audio 213, which may be heard locally at the provider device 205.

In some examples, code 210 may be injected into each of the processes 201, 202, and 203. In some cases, the code 210 may reserve shared memory 214 for writing audio data. In an example, the code 210 may be injected into the processes on the provider device 205 such that when one of the processes 201, 202, or 203 calls the native audio mixer 212, the code 210 is also called by the respective process. For example, process 202 may execute so as to output audio component 206c into native audio mixer 212. In doing so, the process 202 may send a request to the audio mixer 212 for an address of a location (e.g., a memory buffer) for writing audio component 206c. The code 210 may operate so as to bind to the location request. Accordingly, audio component 206c that is written to the storage location corresponding to the location request may be obtained so as to define obtained audio data 220c. In an example, the code 210 operates to copy audio component 206c from a memory buffer associated with the native audio mixer 212, thereby obtaining audio data from a storage location. The code 210 may store the obtained audio data 220c in shared memory 214. Provider device 205 may comprise shared memory 214, or shared memory 214 may be located externally to provider device 205. After the audio components are stored at the shared memory 214, the audio components may be individually processed. For example, process-specific audio mixer 215 may apply user-selected settings to determine which audio components get extracted from the shared memory and transmitted. These user-selected settings may be adjusted in real-time in an example broadcast scenario. In another example, audio components may be saved at the shared memory 214 for post-processing or other operations in which audio components may be processed or used individually.

Similarly, the process 201 may request an address of one or more storage locations (e.g., memory buffers) for writing audio components 206a and 206b. The injected code 210 may operate so as to link to the request, such that the one or more storage locations that are received in response to the request are determined. The one or more storage locations may be associated with buffers at which the audio components 206a and 206b may be stored for input to native audio mixer 212. Thus, the one or more storage locations may be associated with buffers at which audio data is stored for input to an API that combines audio data from a plurality of computing processes 201, 202, and 203. The audio components 206a and 206b may be obtained individually, so as to define obtained audio data 220a and 220b, respectively. The obtained audio data 220a and 220b may be stored in shared memory 214.

Additionally, in the example of FIG. 2, the process 203 may request an address of one or more storage locations (e.g., memory buffers) for writing audio component 206d. The injected code 210 may also link to this request, such that the one or more storage locations that are received in response to the request are determined. The audio component 206d may then be obtained from the determined storage locations, so as to define obtained audio data 220d. The obtained audio data 220d may then also be stored in shared memory 214.

As shown, audio data stored in shared memory 214 may be processed individually for each of the one or more computing processes. In an example, as discussed above, audio data from a given computing process executing on the provider device 205 might not, based on a user selection for example, be captured and/or transmitted to external spectators/viewers or other devices. For example, in some cases, process-specific audio mixer 215 may receive instructions to capture audio data from processes 201 and 202 but to not capture audio data from process 203. In this example, process-specific audio mixer 215 may extract obtained audio data 220a, 220b and 220c (obtained from processes 201 and 202) from shared memory 214 for transmission to external spectators/viewers. By contrast, process-specific audio mixer may not extract obtained audio data 220d (obtained from process 203) from shared memory 214. As a result, obtained audio data 220d may not be transmitted to external spectators/viewers. This example is depicted in FIG. 2 by showing that transmitted (spectator or viewer) audio data 216 includes audio data 220a, 220b, and 220c but does not include audio data 220d (as indicated by the large letter X drawn over audio data 220d). Thus, in the example of FIG. 2, audio data 220d obtained from process 203 is omitted from the transmitted audio 216. In a specific example, a user that is transmitting a video game may also be chatting to friends while playing the game. The user might prefer that the chat audio is not transmitted. As shown, audio data 220d may correspond to the chat audio, and the user may control the audio data 220d so that it is not extracted from the shared memory 214 for transmission.

In some examples, the obtained audio data may be stored in the shared memory 214 at one or more assigned data ranges, and the audio data may be extracted from the shared memory by copying or otherwise obtaining the audio data from the assigned memory ranges and providing the data to one or more transmission components, such as an audio encoder, transceiver, network adapter, or other transmission components. For example, audio data 220*a-d* may each have a respective assigned data range within shared memory 214. Each of audio data 220*a-c* may be extracted from the shared memory 214 by obtaining each of audio data 220*a-c* from its respective assigned data range. By contrast, audio data 220*d* may not be captured and, therefore, not extracted from its respective assigned data range.

The process-specific audio mixer 215 may comprise a user interface, an example of which is described in detail below with reference to FIG. 3. In some cases, as shown, captured audio data 220*a-c* may be combined at the process-specific audio mixer 215 into a single audio stream. This audio stream may be transmitted to viewers as transmitted (spectator or viewer) audio 216. Audio 216 may be transmitted to at least one other computing device. Audio 216 may comprise one or more captured audio components from one or more computing processes, and a user may select and control each of the one or more captured audio components using the process-specific audio mixer 215.

Figure 3:
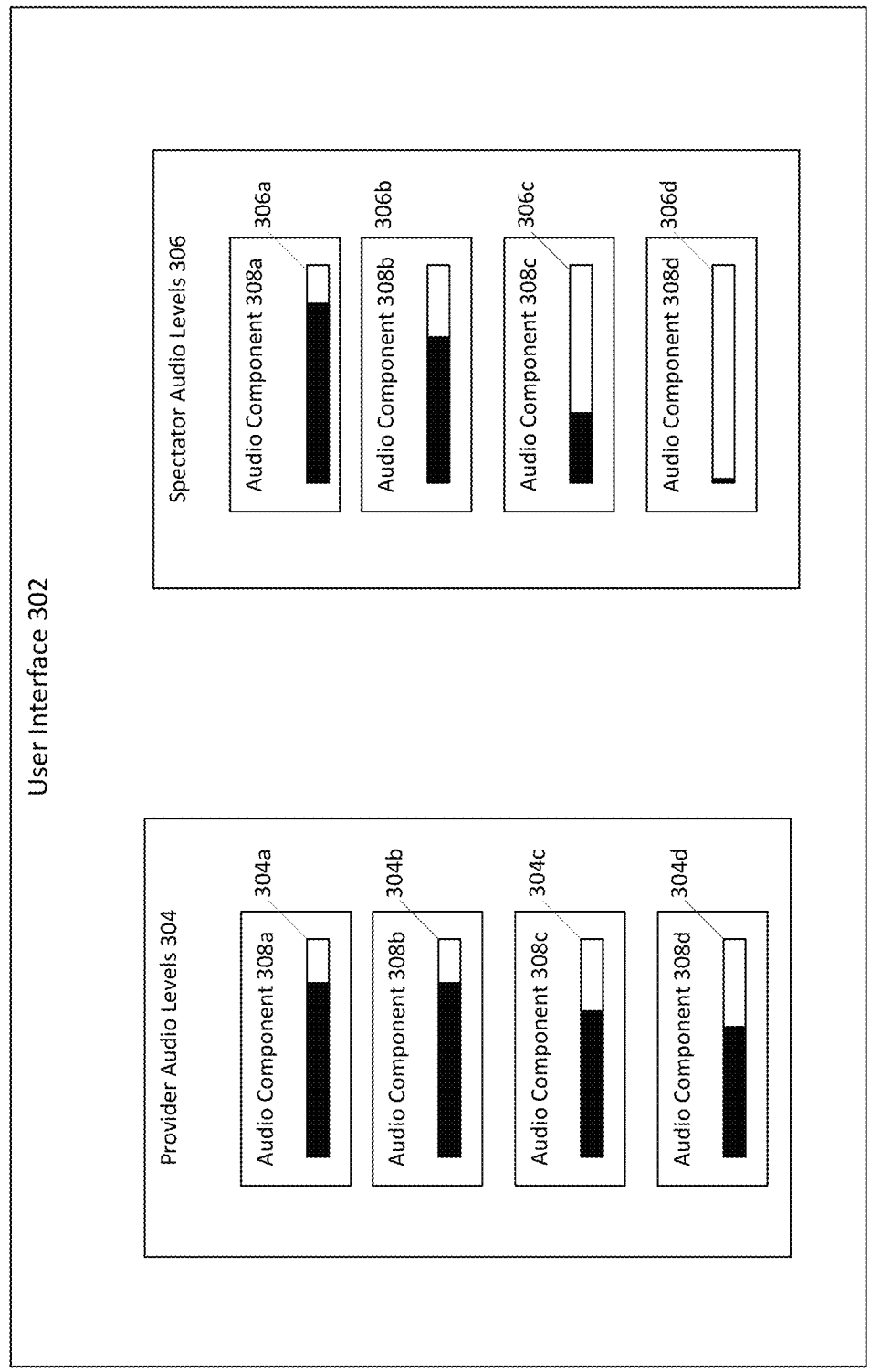
FIG. 3 is a diagram illustrating an example user interface that may be used in accordance with the present disclosure.

Referring also to FIG. 3, an example user interface 302 is shown. User interface 302 may allow the user of a provider device described herein to select and control audio. User interface 302 displays provider levels 304, which may include volume levels 304*a-d* corresponding to a plurality of audio components 308*a-d*, respectively. The audio components may each correspond to different computing processes that are executing on a provider device, for instance the provider devices 105 and 205. The audio levels 304*a-d* may correspond to volume levels that are played locally at the provider device. Thus, for example, the user may actuate an option associated with the audio level 304*a* to adjust the volume that audio component 308 is played at the provider device. The option may be actuated on user interface 302 using a cursor, touch-screen, or the like.

In some cases, for example cases in which the provider device is transmitting to streaming service 120, the user interface 302 may display spectator (or viewer) audio levels 306. Spectator audio levels may include volume levels 306*a-d* of audio components 308*a-d*, respectively. As described above, audio components 308 may each correspond to different computing processes that are executing on a provider device, for instance the provider devices 105 and 205. The audio levels 306*a-d* may correspond to volume levels that are broadcast, for instance to viewers 110. Thus, for example, the user may actuate an option associated with the audio level 306*a* to adjust the volume that audio component 308 is played at a spectator device. Various options may be actuated on user interface 302 using a cursor, touch-screen, or the like.

In some cases, as described above, a user may select which audio components are captured. In some examples, a provider device may receive an input indicating one or more computing processes from which to capture audio data for transmission to at least one other computing device. By way of example, a user may actuate a mute option on user interface 302. The mute option may correspond to a given audio component on the user interface 302, so that the given audio component is not captured. By way of another example, a user may turn the audio level 306 all the way down to prevent the audio component associated with the audio level from being captured. In an example broadcasting scenario, audio levels 306 may be adjusted, and in turn, volume received by viewers may be adjusted accordingly in real time. Further, an audio component that is being captured may discontinue being captured in real-time via an adjustment of its associated audio level. Conversely, an audio component that is not being captured or broadcast may be switched so as to be captured in real-time via an adjustment on the user interface 302.

Still referring to FIG. 3, when audio data is captured, a provider may control, for example, audio associated with individual computing processes. Further, the provider may control the same audio component differently with respect to how the audio component is played locally and how the audio component is transmitted. In particular, in accordance with the illustrated example, the provider may play and transmit audio component 308*a* at approximately the same audio levels 304*a* and 306*a*, respectively. The provider may play audio component 308*d* locally while not capturing (or transmitting) audio component 308*d*. Conversely, the provider may capture and transmit an audio component that is not played locally. By way of further example, the provider may play audio component 308*c* at a provider audio level 304*c*, and the provider may transmit audio component 308*c* at a spectator audio level 306C that is less than provider audio level 304*c*. Thus, a provider device may receive an input that allows selection of volume for audio data for each of one or more computing processes.

As shown, via example user interface 302, a provider may control audio associated with each computing process, such that each computing process may be controlled differently. Further, user interface 302 may allow a different volume to be selected for audio data transmission for each of one or more computing processes. In some cases, the provider may control more than one audio component per a given computing process. In an example, an audio component of a given computing process is transmitted while another audio component of the given computing process is not transmitted. In addition to allowing a user to individually control or adjust audio associated with a plurality of computing processes, in an example broadcasting scenario, the user interface 302 may display spectator audio levels 306 so that a user may view each audio component, and their associated audio levels, that is being broadcast and heard as part of an audio stream.

Figure 4:
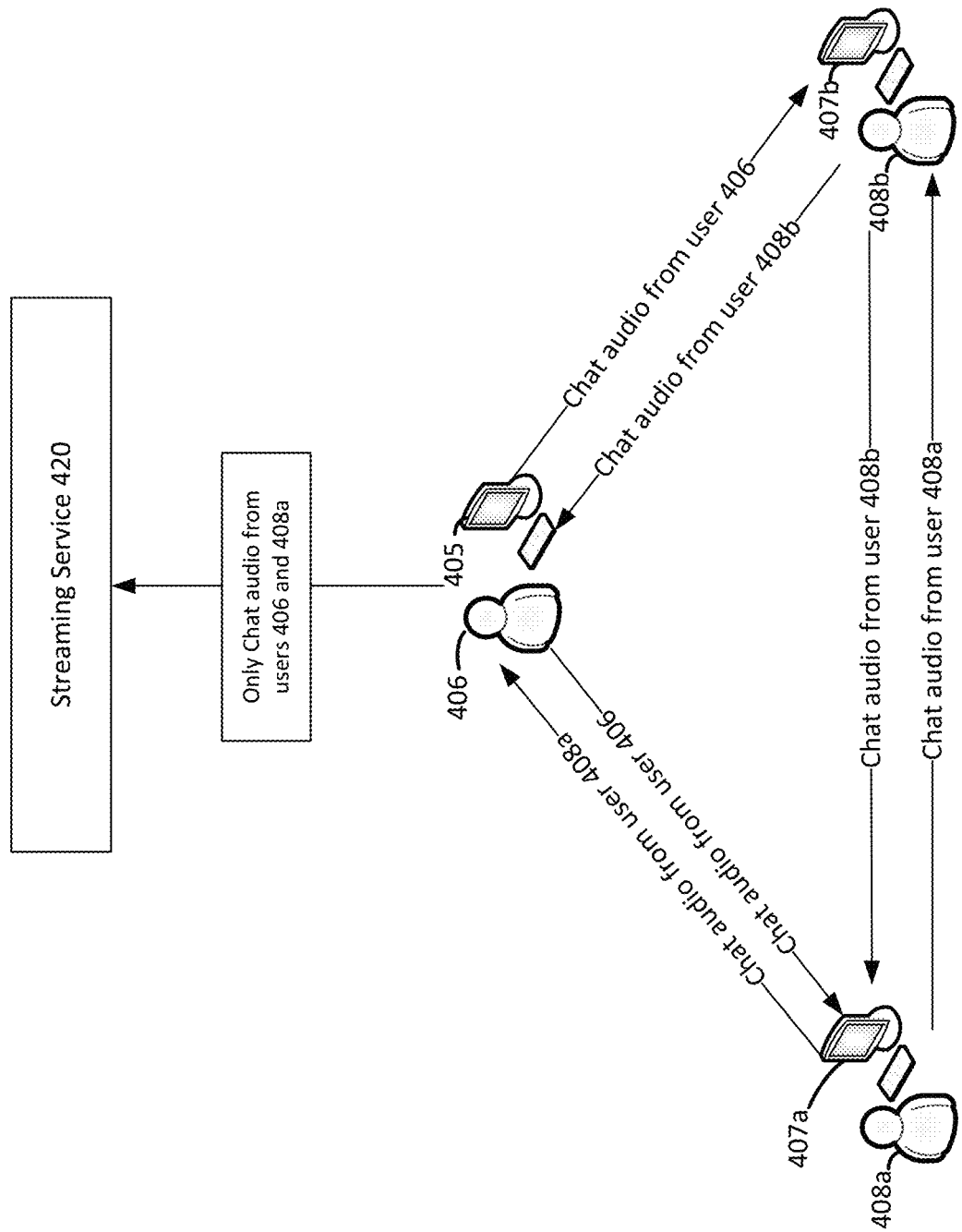
FIG. 4 is a diagram illustrating an example selective chat audio capture in accordance with the present disclosure.

Referring now to FIG. 4, as described above, a provider may control more than one audio component per a given computing process. FIG. 4 depicts an example in which a provider 406, using provider device 405, may control more than one audio component per a given computing process. For example, provider 405 may select an audio component of a given computing process for transmission while also selecting another audio component of the given computing process for only local play. To illustrate an example, FIG. 4 depicts a computing process comprising an example chat application. The chat application, and thus the computing process, comprises voice audio that is communicated among provider 406 and users 408*a* and 408*b*. The example chat application may allow user 408*a* to use computing device 407*a* to speak to provider 406 and user 408*b*. User 408*b* may use computing device 407*b* to speak to user 408*a* and provider 406, and provider 406 may use provider device 405 to speak to user 408*a* and 408*b*. Thus, the computing process executing on the provider device 405 may comprise a plurality of audio components. For example, the computing process executing on the provider device 405 may comprise an audio component representative of voice audio originating from the user 408*a*, an audio component representative of voice audio originating from user 408*b*, and an audio component representative of voice audio originating from provider 406.

In accordance with the illustrated example, the provider 406 may transmit audio data to streaming service 420. The provider 406 may determine that chat audio from user 408*b* should not be transmitted to the streaming service 420. Thus, using a user interface such as the example user interface 302, the provider 406 may select specific audio components of the chat computing process that should be captured and transmitted. In particular, in accordance with the illustrated example, the provider 406 may select the audio component representative of voice audio originating from the user 408*a*, and the audio component representative of voice audio originating from provider 406, for capture and transmission to streaming service 420. In an example, the provider 406 may actuate a setting on a user interface to instruct the provider device 405 to refrain from capturing the audio component representative of voice audio originating from user 408*b* for transmission to streaming service 420. In some cases, although the provider 406 might not want to transmit the audio component representative of voice audio originating from user 408*b*, the provider may still select to hear, at the provider device 405, the audio component representative of voice audio originating from user 408*b*. Accordingly, the provider may choose to play the audio component representative of voice audio originating from user 408*b* locally, while not transmitting the audio component representative of voice originating from user 408. In an alternative example, the provider may select a different volume for audio data transmission for each of the one or more audio components of the example chat computing process.

Figure 5:
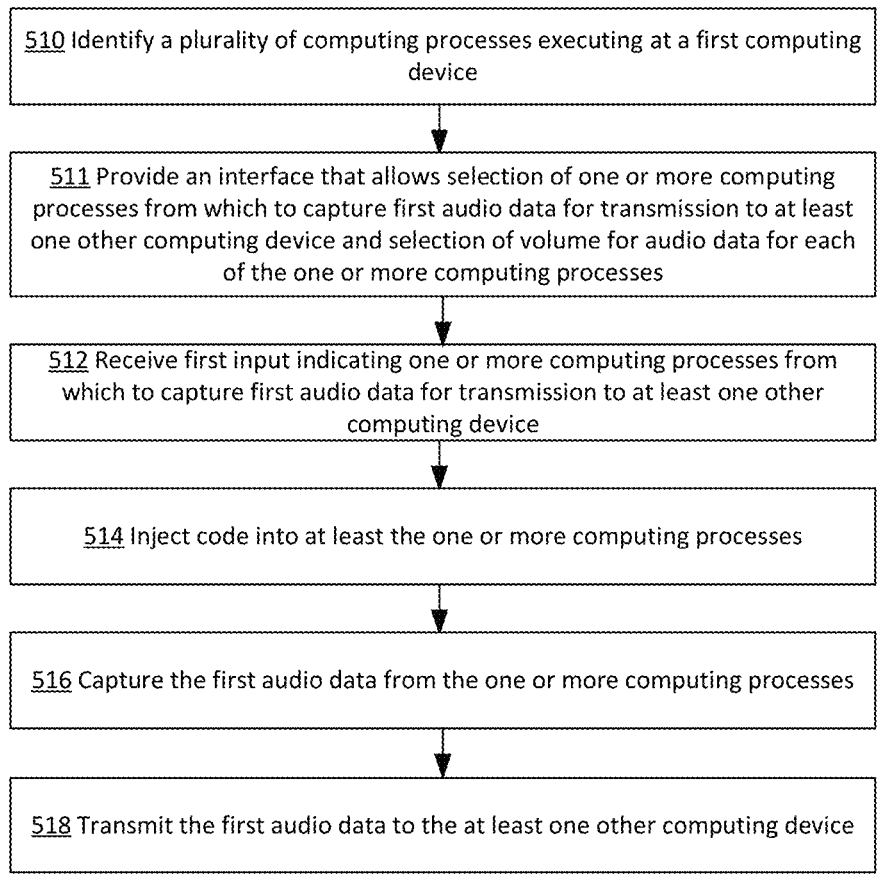
FIG. 5 is a flowchart illustrating an example process for audio capturing that may be used in accordance with the present disclosure.

FIG. 5 is a flowchart illustrating an example process for audio capturing that may be used in accordance with the present disclosure. The process of FIG. 5 is initiated at operation 510, at which a plurality of computing processes executing at a first computing device are identified. The first computing device may be a provider device, as described above, such as the provider devices 105, 205, or 405. As set forth above, the computing processes may comprise various applications. By way of example, and without limitation, the identified computing processes may include a chat application, a video game, an email application, live video, a music playback application, or the like. Further, each of the computing processes may include one or more audio components. In some cases, a chat application may include an audio component for each user participating in the chat application.

At operation 511, an interface is provided, such as user interface 302 for example. The interface may allow selection of one or more computing processes from which to capture first audio data for transmission to at least one other computing device. Using the provided interface, a provider may control, for example, audio associated with individual computing processes. Using the provided interface, a provider may control audio associated with each computing process, such that each computing process may be controlled differently. Further, the provider may control the same audio component differently with respect to how the audio component is played locally and how the audio component is transmitted.

The provided interface may also allow selection of volume for audio data for each of the one or more computing processes. By way of example, an example user interface may allow a different volume to be selected for audio data transmission for each of one or more computing processes. Additionally, the user interface may allow audio data for a particular application to be captured and/or transmitted with a volume that is different from a volume at which the audio data from that application is played locally at the provider device. In some cases, the user interface may allow a provider to control more than one audio component per a given computing process. In an example, the user interface may allow an audio component of a given computing process to be transmitted while another audio component of the given computing process is not transmitted. In addition to allowing a user to individually control or adjust audio associated with a plurality of computing processes, in an example broadcasting scenario, the user interface may display spectator audio levels so that a user may view each audio component, and their associated audio levels, that is being broadcast and heard by viewers as part of an audio stream.

At operation 512, a first input is received. The first input indicates one or more computing processes from which to capture first audio data for transmission to at least one other computing device. In some cases, a user may select which audio components are captured via the provided interface. By way of example, using the provided interface, a user may actuate a mute option that corresponds to a given audio component, so that the given audio component is not captured. By way of another example, a user may turn a given audio level displayed by the interface down to prevent the audio component associated with the audio level from being captured. By way of another example, a user may select a non-muted or non-zero volume level for one or more applications, thereby indicating that audio from those applications is to be captured and transmitted at the selected volume level. In an example broadcasting scenario, an audio component that is being captured may discontinue being captured in real time via the provided interface. Conversely, an audio component that is not being captured may be switched so as to be captured in real-time via an adjustment on the provided user interface. Thus, a provider device may receive various inputs that indicate one or more computing processes from which to capture audio. Further, a provider device may receive various inputs that indicate one or more computing processes from which to refrain from capturing audio.

At operation 514, code is injected into at least the one more computing processes. In some examples, one or more indications of one or more storage locations of the first audio data, upon being output by the one or more computing processes, are determined based, at least in part, on execution of the code. For example, in some cases, the code may be injected into a plurality of computing processes, such that anytime one of the computing processes calls a particular API to receive a storage location for audio data, the code is executed. The injected code may then be executed to determine the storage locations and to obtain the audio data from the determined storage locations as described below with respect to operation 516.

At operation 516, first audio data is captured from the one or more computing processes. The first audio data may be captured individually for each of the one or more computing processes. In some examples, the first audio data may be captured by copying audio output from one or more processes as input to a native audio API, storing the copied audio output in shared memory, and then selectively extracting audio data from the shared memory for transmission. In particular, the computing processes may call an API, such as audio mixer 212 for example, to output respective audio components to storage locations associated with the API. In doing so, the computing processes may send a request to the API for an address of a location (e.g., a memory buffer) for writing respective audio components. In some cases, the one or more storage locations are associated with buffers at which the audio data is stored for input to an API that combines audio data from a plurality of computing processes. The injected code may operate so as to bind to the location request. Accordingly, the storage location of audio components for input to the API may be determined based, at least in part, on execution of the injected code. Using an indication of one or more storage locations, the injected code may operate to copy or otherwise obtain audio data from the one or more locations. The obtained audio data may then be stored in a shared memory, such as shared memory 214 of FIG. 2.

In some cases, after the obtained audio data is stored at a shared memory, the audio components of the obtained audio data may be individually processed. For example, a process-specific audio mixer, such as a process-specific audio mixer 215, may apply user-selected settings to determine which audio components of the obtained audio data gets captured for transmission to one or more other computing devices, for example via a streaming service. In particular, in some cases, audio data from the one or more computing processes selected at operation 511 may be captured for transmission, such as streaming transmission, to one or more other computing devices, while audio data from one or more other computing processes may not be captured and, therefore, not transmitted to the to one or more other computing devices. Additionally, in some examples, audio data from the one or more other computing processes that is not transmitted may be played locally by the provider's computing device to a user of the provider's computing device. In some examples, the process-specific audio mixer 215 may be used to adjust the volume of audio data separately for each process and/or component. In particular, in some examples, each of the one or more processes and/or components may potentially have its respective audio data transmitted at different volume from one another. Additionally, in some examples, for at least one computing process, a volume that is selected for the audio data transmission may be different from a volume at which audio data from the computing process is played locally by the provider computing device.

Thus, as set forth above, capturing of the first audio data from the one or more computing processes may include, for example, copying audio output from the one or more processes as input to a native audio API, storing the copied audio output in shared memory, and then selectively extracting audio data from the shared memory for transmission. As also set forth above, in some examples, audio data may be stored in the shared memory at one or more assigned data ranges, and the audio data may be extracted from the shared memory by copying or otherwise obtaining the data from the assigned memory ranges and providing the data to one or more transmission components, such as an audio encoder, transceiver, network adapter, or other transmission components.

At operation 518, the first audio data may be transmitted to at least one other computing device. For example, as set forth above, the first audio data may be streamed or transmitted, along with captured video data, to a streaming service. The streaming service may then stream the captured audio and video data to one or more spectators or other viewers. As set forth above, in one specific example, the streaming service may be a video game streaming service, and the captured audio and video may include live video game content as well as potentially other related audio captured from other applications or processes.

As set forth above, in some examples data from two or more computing processes may be captured and combined. In particular, first input may be received indicating two or more computing processes of a plurality of computing processes on the provider's computing device from which to capture first audio data. Code may be injected into at least the two or more computing processes, and one or more indications of one or more storage locations of the first audio data upon being output by the two or more computing processes may be determined based, at least in part, on execution of the code. The first audio data may then be captured from the two or more computing processes. The first audio data may be captured individually for each of the two or more computing processes. In some examples, the first audio data may be captured at least partially simultaneously from each of the two or more computing processes. The first audio data from the two or more computing processes may then be combined into a combined audio output. As set forth above, the first audio data may be combined based on user instructions, for example as provided via the interface of FIG. 3, such as to include (or not include) audio from certain processes in the combined audio output and/or volume selections for audio from individual processes in the combined audio output. The combined audio output may be streamed/transmitted to at least one other computing device and/or stored for subsequent processing. Video data may also be captured from the provider's computing device and streamed/transmitted to the at least one other computing device in combination with the combined audio output. As also set forth above, in some examples, an interface may be provided that allows a different volume to be selected for capturing, audio data transmission, and/or storage for each of the two or more computing processes.

As also set forth above, in some examples, the first audio data may be transmitted or otherwise provided for playing, and at least a first portion of the first audio data may be played to a user while a subsequent portion of the first audio data is still being captured. For example, in some cases, first audio data may be captured, transmitted, and/or played in real-time. Additionally, in some examples, the first audio data may be captured from a live event, such as a live video game, live chat session, or other live event. The first audio data from the live event may be played to users in real-time as the live event is still occurring, in some cases together with video of the live event, for example using live streaming techniques.

Figure 6:
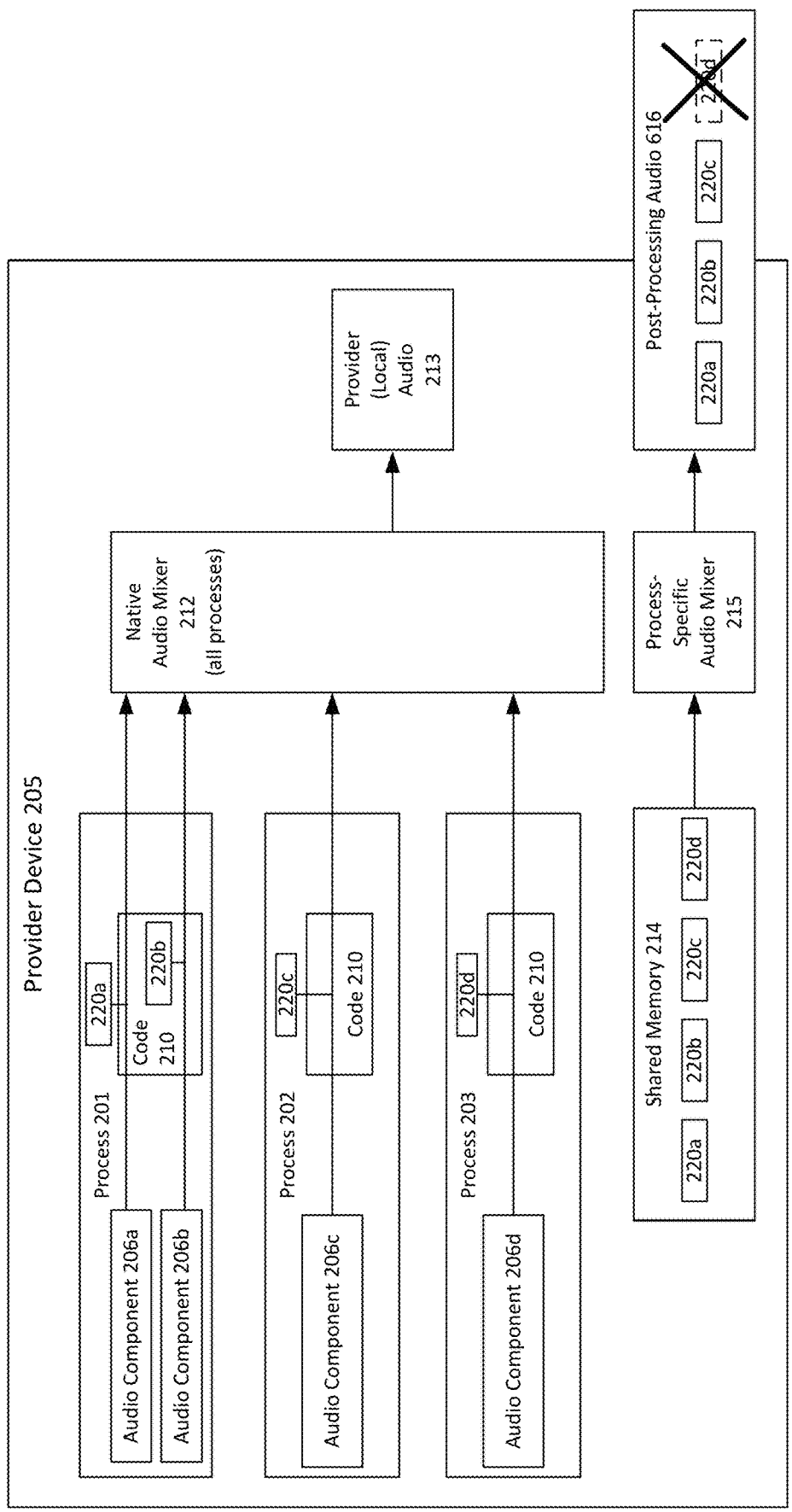
FIG. 6 is a diagram illustrating a second example audio capturing that may be used in accordance with the present disclosure.

As mentioned above, in some examples, audio components may be stored at the shared memory 214 for post-processing or other operations in which audio components may be processed or used individually. Such operations may be alternative to, or in addition to, the example transmission operations described above. Thus, there is no requirement that audio data captured using the techniques described herein must be streamed or transmitted to other devices. For example, referring to FIG. 6, the example provider device 205 depicted in FIG. 2 is shown performing audio capture for post-processing operations without transmitting the captured audio. In some cases, select audio components may be captured for transmission and for post-processing operations. In an example, as discussed above, audio data from a given computing process executing on the provider device 205 might not, based on a user selection for example, be captured and/or stored for post-processing operations. For example, in some cases, process-specific audio mixer 215 may receive instructions to capture audio data from processes 201 and 202 but to not capture audio data from process 203. In this example, process-specific audio mixer 215 may extract obtained audio data 220a, 220b and 220c (obtained from processes 201 and 202) from shared memory 214 for post-processing. By contrast, process-specific audio mixer may not extract obtained audio data 220d (obtained from process 203) from shared memory 214. As a result, obtained audio data 220d may not be stored for post-processing operations. This example is depicted in FIG. 6 by showing that post-processing audio data 616 includes audio data 220a, 220b, and 220c but does not include audio data 220d (as indicated by the large letter X drawn over audio data 220d). Thus, in the example of FIG. 6, audio data 220d obtained from process 203 is omitted from the post-processing audio data 616.

Thus, in some examples, upon being obtained from one or more computing processes, audio data may be stored for subsequent processing, for example in shared memory 214. In a specific example, a user that is playing a video game may create a recording of the video game. The user might prefer that the recording (e.g., upon being edited) does not include certain audio that was playing at the user's device while the user was playing the video game, and thus while the video was being recorded. For example, a user that is recording a video game may also be chatting to friends while playing the game. The user might prefer that the chat audio is not included along with an edited recorded copy of the video game. As shown, audio data 220d may correspond to the chat audio, and the user may control the audio data 220d so that it is not extracted from the shared memory 214 for post-processing and/or inclusion in an edited recording of the video game. Additionally, in some examples, any or all of the selective control volume options described above for transmitted audio (e.g., individually controlling volume for each process and/or component, adjusting volume for each process and/or component to be different from volume played by the native audio mixer API, etc.) may also be provided for audio that is stored for post-processing.

Figure 7:
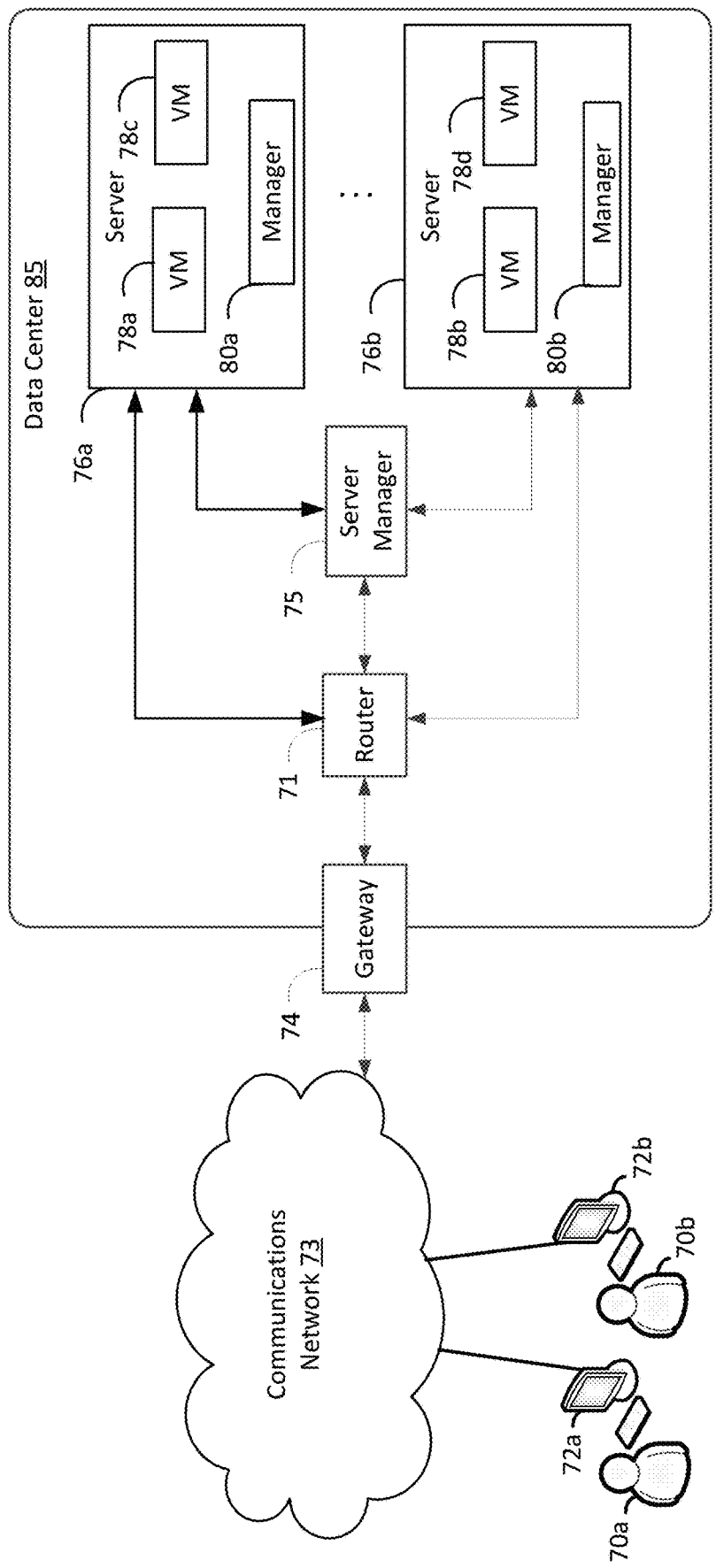
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
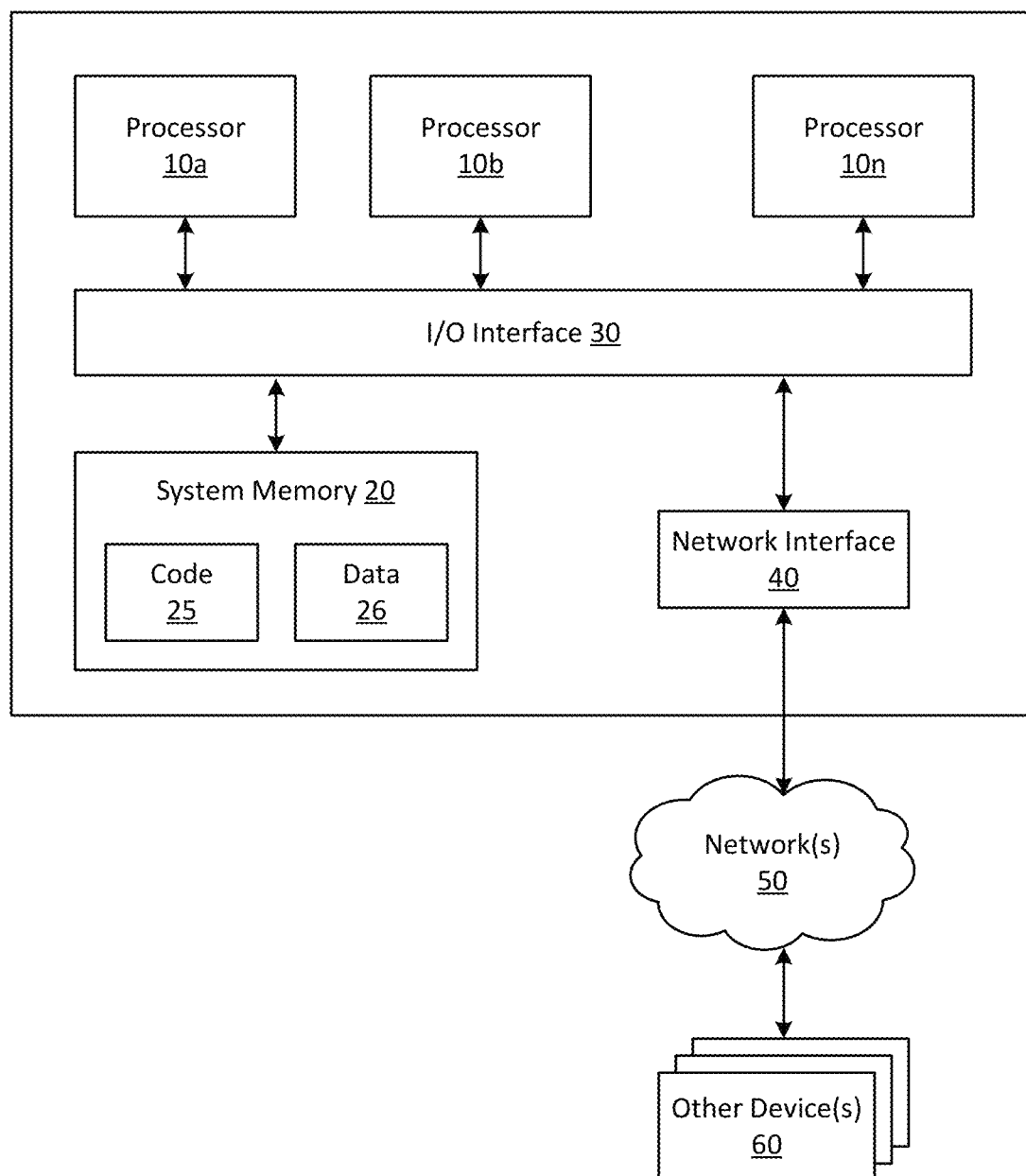
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein instructions that, upon execution by the one or more processors, cause the computing system to perform operations comprising:
identifying a plurality of computing processes executing at a first computing device;
receiving a user selection of a first subset of computing processes of the plurality of computing processes from which to capture first audio data for streaming from the first computing device to a second computing device, wherein a second subset of computing processes of the plurality of computing processes is not selected;
based on the user selection, capturing the first audio data from the first subset of computing processes, wherein the capturing comprises copying the first audio data from one or more first storage locations associated with a native audio mixer to one or more second storage locations; and
streaming the first audio data to the second computing device, wherein second audio data from the second subset of computing processes is not streamed to the second computing device, but is played locally by the first computing device in conjunction with the first audio data.

2. The computing system of claim 1, wherein the operations further comprise injecting code into the first subset of computing processes.

3. The computing system of claim 2, wherein one or more indications of one or more storage locations of the first audio data upon being output by the first subset of computing processes are determined based, at least in part, on execution of the code.

4. The computing system of claim 3, wherein the one or more first storage locations are associated with buffers at which the first audio data is stored for input to an application programming interface (API) that combines audio data from the plurality of computing processes.

5. The computing system of claim 1, wherein the operations further comprise capturing video data from the first computing device and transmitting the video data to the second computing device in combination with the first audio data.

6. The computing system of claim 1, wherein the operations further comprise providing an interface that allows a different volume to be selected for audio data transmission for each of the first subset of computing processes.

7. The computing system of claim 1, wherein the first audio data is captured at least partially simultaneously from each of the first subset of computing processes.

8. A computer-implemented method comprising:
identifying a plurality of computing processes executing at a first computing device;
receiving a user selection of a first subset of computing processes of the plurality of computing processes from which to capture first audio data for streaming from the first computing device to a second computing device, wherein a second subset of computing processes of the plurality of computing processes is not selected;
based on the user selection, capturing the first audio data from the first subset of computing processes, wherein the capturing comprises copying the first audio data from one or more first storage locations associated with a native audio mixer to one or more second storage locations; and
streaming the first audio data to the second computing device, wherein second audio data from the second subset of computing processes is not streamed to the second computing device, but is played locally by the first computing device in conjunction with the first audio data.

9. The computer-implemented method of claim 8, further comprising injecting code into the first subset of computing processes.

10. The computer-implemented method of claim 9, wherein one or more indications of one or more storage locations of the first audio data upon being output by the first subset of computing processes are determined based, at least in part, on execution of the code.

11. The computer-implemented method of claim 10, wherein the one or more first storage locations are associated with buffers at which the first audio data is stored for input to an application programming interface (API) that combines audio data from the plurality of computing processes.

12. The computer-implemented method of claim 8, further comprising capturing video data from the first computing device and transmitting the video data to the second computing device in combination with the first audio data.

13. The computer-implemented method of claim 8, further comprising providing an interface that allows a different volume to be selected for audio data transmission for each of the first subset of computing processes.

14. The computer-implemented method of claim 8, wherein the first audio data is captured at least partially simultaneously from each of the first subset of computing processes.

15. One or more non-transitory computer-readable storage media having stored thereon instructions that, upon execution by a computing device, cause the computing device to perform operations comprising:
identifying a plurality of computing processes executing at a first computing device;
receiving a user selection of a first subset of computing processes of the plurality of computing processes from which to capture first audio data for streaming from the first computing device to a second computing device, wherein a second subset of computing processes of the plurality of computing processes is not selected;
based on the user selection, capturing the first audio data from the first subset of computing processes, wherein the capturing comprises copying the first audio data from one or more first storage locations associated with a native audio mixer to one or more second storage locations; and
streaming the first audio data to the second computing device, wherein second audio data from the second subset of computing processes is not streamed to the second computing device, but is played locally by the first computing device in conjunction with the first audio data.

16. The one or more non-transitory computer-readable storage media of claim 15, wherein the operations further comprise injecting code into the first subset of computing processes.

17. The one or more non-transitory computer-readable storage media of claim 16, wherein one or more indications of one or more storage locations of the first audio data upon being output by the first subset of computing processes are determined based, at least in part, on execution of the code.

18. The one or more non-transitory computer-readable storage media of claim 17, wherein the one or more first storage locations are associated with buffers at which the first audio data is stored for input to an application programming interface (API) that combines audio data from the plurality of computing processes.

19. The one or more non-transitory computer-readable storage media of claim 15, wherein the operations further comprise providing an interface that allows a different volume to be selected for audio data transmission for each of the first subset of computing processes.

20. The one or more non-transitory computer-readable storage media of claim 15 wherein the first audio data is captured at least partially simultaneously from each of the first subset of computing processes.

* * * * *